United States Patent [19]

Hunter, Jr.

[11] 3,720,761

[45] March 13, 1973

[54] INJECTABLE RADIO-PHARMACEUTICAL SCANNING AGENT AND PREPARATION

[76] Inventor: William W. Hunter, Jr., 313 West Seventh Avenue, Columbus, Ohio

[22] Filed: Oct. 14, 1968

[21] Appl. No.: 767,480

[52] U.S. Cl. .............424/1, 250/106 T, 252/301.1 R
[51] Int. Cl. ...............................................A61k 27/04
[58] Field of Search..424/164; 252/301.1; 250/106 T

[56] References Cited

UNITED STATES PATENTS 2,884,352   4/1959   Brenner et al.........................424/164

OTHER PUBLICATIONS

Kniseley et al., Nuclear Science Abstracts, Vol. 20, No. 24, Dec. 31, 1966 – Entry No. 45523
Nuclear Science Abstracts, Vol. 20, No. 2 Jan. 31, 1966 – Entry No. 1696

Primary Examiner—Benjamin R. Padgett
Attorney—Francis T. Kremblas, Jr.

[57] ABSTRACT

A formation for pharmaceutical preparations and method for preparing same which is characterized by the use of the two through seven carbon polyhydric alcohols to stabilize solid particles suspended in a liquid medium. Using the method of the present invention, the particle size may be more closely controlled due to the excellent stabilization properties of the polyhydric alcohols which inhibits aggregation or clumping of the solid particles in the liquid medium.

6 Claims, No Drawings

INJECTABLE RADIO-PHARMACEUTICAL SCANNING AGENT AND PREPARATION

The present invention relates generally to pharmaceutical preparations and particularly to a novel method of stabilizing pharmaceutical suspensions and to the novel composition resulting therefrom.

Many pharmaceutical preparations must be prepared in an aqueous medium in a relatively stable suspension in order to be effective in the treatment of patients or in diagnostic procedure.

In particular, diagnostic procedures relating to the radioisotope scanning of various organs has become increasingly important in supplying the medical profession with accurate knowledge in order to make a faster and more reliable diagnosis.

In this field of medicine, various solid particles are utilized in a preparation to localize in the reticulo-endotherlial system, such as for example, sulfer, strontium carbonate, or iron hydroxide. These particles are labeled with a radioisotope and suspended in a liquid medium for injection into the human body. In the preparation of these materials the size of the suspended particles is extremely important as the particles must pass through the blood stream and to certain organs of the body without being trapped in the lungs of the patient. Generally the particle size must be less than 1-micron in diameter if the particles are to pass through the small capillaries in the human lung. Or if the lung itself is to be scanned, the ideal particle size would be in the range of 6 to 8 microns.

A major problem in the preparation of these colloidal-type suspensions in this field of nuclear medicine is that the generally used solid materials tend to form aggregates or clump together in the suspension resulting in an increased particle size.

When this phenomenon occurs a substantial portion of the particles are trapped in the lung of the patient instead of proceeding to the various organs which are to be scanned. Therefore the employment of a stabilizing agent is necessary to prevent this particle aggregation.

However, prior substances used for stabilizing agents, such as gelatin, carboxmethylcellulose, or medium and low molecular weight dextran, have not proved to be wholly satisfactory because all of these substances have been incriminated as the causative agent of drug reactions in some patients.

In general, the composition and the method of preparation of the present invention comprises the discovery of a new use for the two through seven chain aliphatic polyhydric alcohols. It has been found that these materials are generally applicable for stabilization of pharmaceutical suspensions. Further, mannitol, one of these polyhydric alcohols, has been used in stabilizing radiopharmaceutical preparations for intravenous injections in humans and no undesirable reactions have been reported. These tests indicate that the polyhydric alcohols are physiologically compatible with the human body and that they stabilize the suspension to prevent the aggregation of the suspended particles for a longer time period than prior means.

It is therefore an object of the present invention to provide a novel pharmaceutical formulation and method for preparing the same for intravenous injection which forms a more stable suspension and which provides a reproducible, more uniform particle size of the particles suspended in the medium as compared to prior methods and means.

It is another object of the present invention to provide a novel pharmaceutical composition and method for preparing the same which greatly reduces the danger of drug reactions in patients as compared to prior methods and means.

Further objects and advantages of the present invention will be apparent from the following description and examples, wherein preferred forms of embodiments of the invention are clearly described.

In the use of the two through seven carbon aliphatic polyhydric alcohols for stabilization of pharmaceutical suspensions and particularly in the stabilization of radioisotope labeled particles in an aqueous medium, they have been found to be completely effective in the prevention of virtually all particle clumping. The results using polyhydric alcohols as stabilizing agents in these preparations surpass even the best results achieved with low molecular weight dextran, which has generally been regarded by those skilled in the art as the best stabilizer prior to the present invention.

Mannitol, a six carbon aliphatic polyhydric alcohol, is readily available and is known not to enter into any major metabolic pathway in the human body. Therefore mannitol in particular, would not disrupt the metabolic equilibrium of even those patients having certain metabolic diseases, and was found to be exceptionally useful for radioisotope scanning preparations and would also be applicable for other injectable preparations.

Mannitol was used according to the present invention to prepare sulfer colloid formulations labeled with Technetium 99m which were utilized in clinical studies of more than 150 patients with no evidence of either drug reactions or substantial lung trapping of the isotope labeled particles. This indicates that there was no clumping of the sulfer particles while in suspension when this polyhydric alcohol was used as the stabilizer.

It was also found by microscopic examination that the particle size of the isotope labeled particles stabilized in suspension with polyhydric alcohols having two through seven carbon atoms was more uniform in the suspension as compared to prior means. This is further evidence that particle aggregation or clumping is prevented when polyhydric alcohols are used as the stabilizing agent.

It should be pointed out that prior approaches to the stabilization of radionuclide suspensions have centered around the use of substances having relatively high molecular weights, such as gelatin, carboxymethy-cellulose and dextran.

These substances were used under the suggested theory that the protective action was largely due to mechanical separation of the particles in suspension. That is, the large molecules formed a barrier between the labeled particles preventing these particles from clumping together with other like particles in the suspension.

However, a novel approach to the problem is presented in the instant invention as the molecular weight of the polyhydric alcohols, having no more than seven carbon atoms is almost negligible as compared to the prior stabilizing substances. Also, the failure of the simple hexose sugars which were tested as stabilizing agents in contrast to the total effectiveness of the polyhydric alcohols suggest that a different phenomena takes place.

Since there is no strongly polarized portion of the polyhydric alcohol molecule, in contrast to the aldehyde or keto group of the simple sugars, it is suggested that the polyhydric alcohol molecule may act to buffer surface charge on the particles in suspension. This buffering action may inhibit the tendency for the colloidal particles to link or clump together due to opposing surface charges between the suspended particles.

In the formulation of radionuclide preparations for human use, a 25 percent solution of mannitol, was used, however, other strength solutions over a relatively wide range were tested with successful results and therefore could be used without departing from the spirit of the present invention.

Other tests were conducted using various other aliphatic polyhydric alcohols, such as glycerol, lyxital, xylitol, sorbital, dulcitol and galactitol and each was found to be effective in the stabilization of pharmaceutical suspensions.

Further tests revealed that the presence of these polyhydric alcohols in the reaction mixture of albumin isotope scanning preparations led to the formulation of more uniformaly sized aggregates of albumin for lung and liver scanning techniques.

Also an excellent lung scanning preparation was made possible by using mannitol in the formulation to stabilize strontium carbonate aggregates in the 6 to 8 micron size range.

The results of these tests suggest that the polyhydric alcohols would be effective non-toxic stabilizers for other pharmaceutical preparations which are dispensed in the form of suspensions, such as for example injectable vitamin preparations; anthelmintics such as phenothiazine, intravenous and oral radiographic contrast agents.

Further details of the present invention will be set forth with respect to the following examples:

EXAMPLE I

A Technetium 99m sulfer colloid preparation was prepared in the following manner:
1. 8.0 ml of Technetium — 99m in a saline solution was filtered into a sterile vial;
2. 1.26 ml of 1N HCl and 0.63 ml of Sodium Thiosulfate was added to the filtered solution and the mixture was heated gently for approximately 3 minutes;
3. The heated mixture was allowed to cool and then was buffered with 1.52 ml of Sodium Phosphate to adjust the pH to between 5.0 and 6.5;
4. 2.54 ml of a solution containing 25 percent mannitol by weight was added to the buffered mixture and the resulting mixture was moderately agitated.

The mixture was examined under a microscope which revealed smooth, round, uniform particles of approximately one-half micron in diameter.

EXAMPLE II

A Technetium — 99m sulfer colloid preparation was prepared in the following manner:
1. 8.0 ml of Technetium — 99m in a saline solution was filtered into a sterile vial;
2. 1.26 ml of 1N HCl and 0.63 ml of Sodium Thiosulfate was added to the filtered solution and the mixture was heated gently for approximately 3 minutes;
3. The heated mixture was allowed to cool and then was buffered with 1.52 ml of Sodium Phosphate to adjust the pH to between 5.0 and 6.5;
4. 2.54 ml of a solution containing 25% lyxitol by weight was added to the buffered mixture and the resulting mixture was moderately agitated.

The mixture was examined under a microscope which revealed smooth, round, uniform particles of approximately one-half micron in diameter.

EXAMPLE III

A Technetium — 99m sulfer colloid preparation was prepared in the following manner:
1. 8.0 ml of Technetium — 99m in a saline solution was filtered into a sterile vial;
2. 1.26 ml of 1N HCl and 0.63 ml of Sodium Thiosulfate was added to the filtered solution and the mixture was heated gently for approximately 3 minutes;
3. The heated mixture was allowed to cool and then was buffered with 1.52 ml of Sodium Phosphate to adjust the pH to between 5.0 and 6.5;
4. 2.54 ml of a solution contining 25 percent glycerol by weight was added to the buffered mixture and the resulting mixture was moderately agitated.

The mixture was examined under a microscope which revealed smooth, round, unifrom particles of approximately one-half micron in diameter.

EXAMPLE IV

A Technetium — 99m sulfer colloid preparation was prepared in the following manner:
1. 8.0 ml of Technetium — 99m in a saline solution was filtered into a sterile vial;
2. 1.26 ml of 1N HCl and 0.63 ml of Sodium Thiosulfate was added to the filtered solution and the mixture was heated gently for approximately 3 minutes;
3. The heated mixture was allowed to cool and then was buffered with 1.52 ml of Sodium Phosphate to adjust the pH to between 5.0 and 6.5;
4. 2.54 ml of a solution containing 25 percent sorbital by weight was added to the buffered mixture and the resulting mixture was moderately agitated.

The mixture was examined under a microscope which revealed smooth, round, unifrom particles of approximately one-half micron in diameter.

EXAMPLE V

An excellent strontium carbonate formulation for lung scanning was prepared in the following manner:
1. 1 cc of 25 percent by volume mannitol solution was added to 3 cc's of saturated $NaHCO_3$ solution, pH 9.4, in a sterile vial;
2. 8 cc's of 0.15 M $NaHCO_3$ eluant labeled with the radioisotope Sr — 87m was added to the the vial;
3. With moderate agitation of the above mixture, approximately 0.15cc of 0.1 M $SrCl_2$ was added to the mixture in the vial;
4. After approximately 2 to 3 minutes lapsed to allow for completion of the precipitation occuring in the vial, the aggregates of $SrCO_3$ were examined under a microscope which showed relatively uniform aggregates of approximately 6 to 8 microns in diameter.

This particle size represents the desired size for localizing in the smallest order of capillaries in the human lung.

I claim:

1. A method for preparing an injectable radio-pharmaceutical colloid scanning agent comprising the steps of mixing a saline solution of Technetium—-99m with hydrochloric acid and sodium thiosulfate; gently heating and agitating said mixture; cooling the mixture and adjusting the pH of said mixture between 5.5 and 6.0; and adding an aliphatic polyhydric alcohol having no less than two or more than seven carbon atoms to the mixture to stabilize the particle size of the precipitated sulfer particles suspended in the mixture.

2. A radio-pharmaceutical scanning agent prepared by the method defined in claim 1.

3. A radio-pharmaceutical scanning agent as defined in claim 1 wherein the precipitated sulfer particles have a size range less than approximately one micron in diameter.

4. A method of preparing an injectable radio-pharmaceutical scanning agent comprising the steps of adding a solution of an aliphatic polyhydric alcohol having no less than two or more than seven carbon atoms to a receptacle containing a saturated solution of sodium bicarbonate; adding a predetermined quantity of sodium bicarbonate eluant labeled with the radioisotope Sr—87m to said receptacle; and moderately agitating the mixture in the receptacle while adding a predetermined quantity of $SrCl_2$ to the mixture.

5. The radio-pharmaceutical scanning agent defined in claim 4 wherein the precipitated $SrCO_3$ aggregates have a size range of approximately 6 to 8 microns in diameter.

6. An injectable radio-pharmaceutical scanning agent prepared by precipitating a radio-pharmaceutical scanning agent labeled with a compatible radio isotope in an aqueous medium and adding an aliphatic polyhydric alcohol having no less than two or more than seven carbon atoms to stabilize the particle size of the precipitate.

* * * * *